(12) United States Patent
Alexander et al.

(10) Patent No.: US 7,254,678 B2
(45) Date of Patent: Aug. 7, 2007

(54) ENHANCED STCX DESIGN TO IMPROVE SUBSEQUENT LOAD EFFICIENCY

(75) Inventors: Gregory William Alexander, Austin, TX (US); Juan Jose Arevalo, Cedar Park, TX (US); Balaram Sinharoy, Poughkeepsie, NY (US); Shih-Hsiung Stephen Tung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/082,761

(22) Filed: Mar. 17, 2005

(65) Prior Publication Data

US 2006/0212653 A1 Sep. 21, 2006

(51) Int. Cl.
*G06F 12/00* (2006.01)
(52) U.S. Cl. .................. 711/122; 711/135
(58) Field of Classification Search .............. None
See application file for complete search history.

(56) References Cited

U.S. PATENT DOCUMENTS

| | | | |
|---|---|---|---|
| 5,706,464 A * | 1/1998 | Moore et al. ............. | 711/122 |
| 6,021,261 A * | 2/2000 | Barrett et al. ............ | 714/37 |
| 7,089,373 B2 * | 8/2006 | Day et al. ............... | 711/145 |
| 7,197,604 B2 * | 3/2007 | Guthrie et al. ........... | 711/142 |
| 2006/0085603 A1 * | 4/2006 | Guthrie et al. ........... | 711/141 |
| 2006/0085604 A1 * | 4/2006 | Guthrie et al. ........... | 711/141 |
| 2006/0271744 A1 * | 11/2006 | Goodman et al. ......... | 711/141 |
| 2007/0033345 A1 * | 2/2007 | Guthrie et al. ........... | 711/122 |

\* cited by examiner

*Primary Examiner*—Reginald Bragdon
*Assistant Examiner*—Mehdi Namazi
(74) *Attorney, Agent, or Firm*—Casimer K. Salys; Dillon & Yudell LLP

(57) ABSTRACT

A method, system and computer program product for processing in a multiprocessor data processing system are disclosed. The method includes, in response to executing a load-and-reserve instruction in a processor core, the processing core sending a load-and-reserve operation for an address to a lower level cache of a memory hierarchy, invalidating data for the address in a store-through upper level cache, and placing data returned from the lower level cache into the store-through upper level cache.

20 Claims, 6 Drawing Sheets

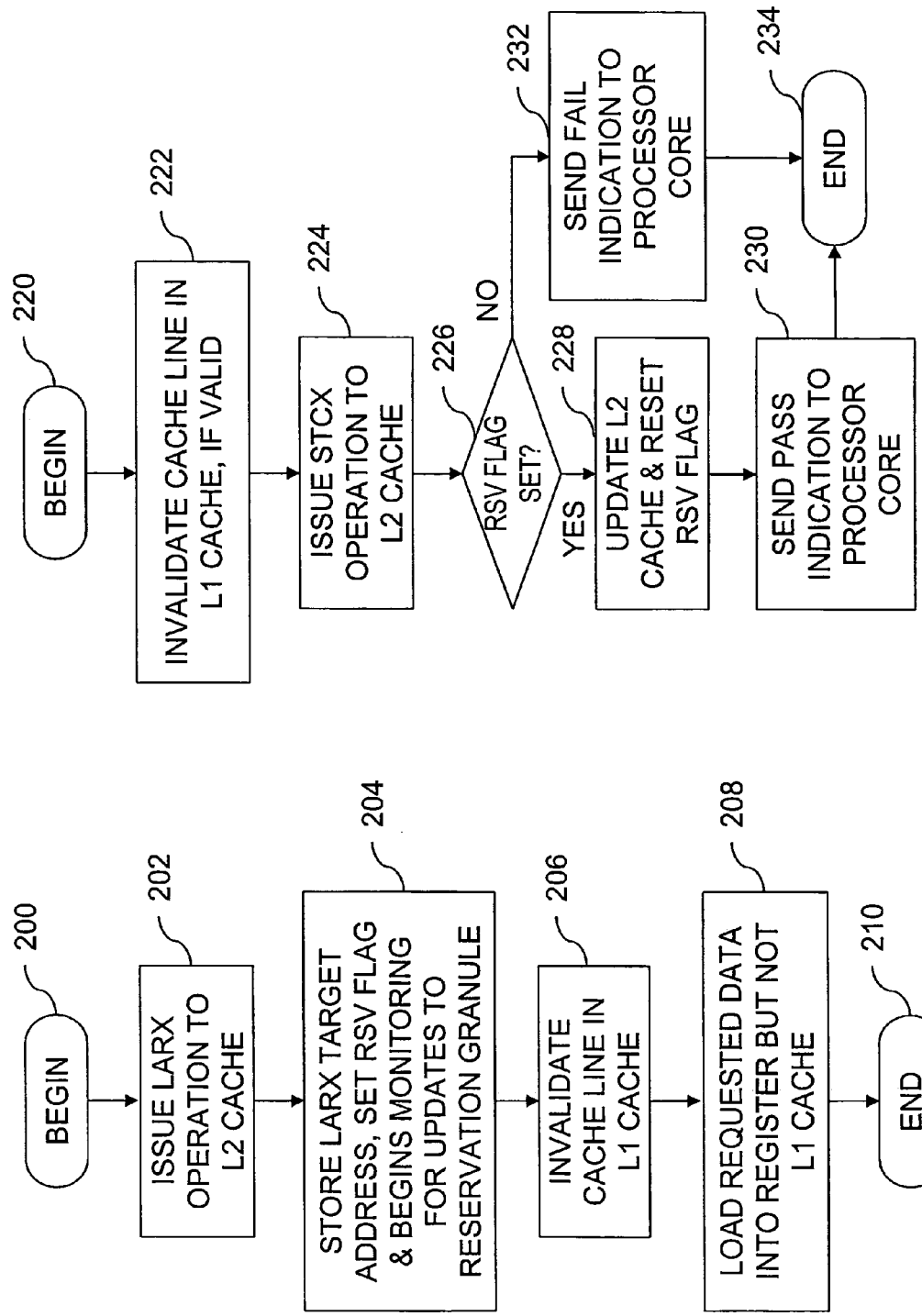

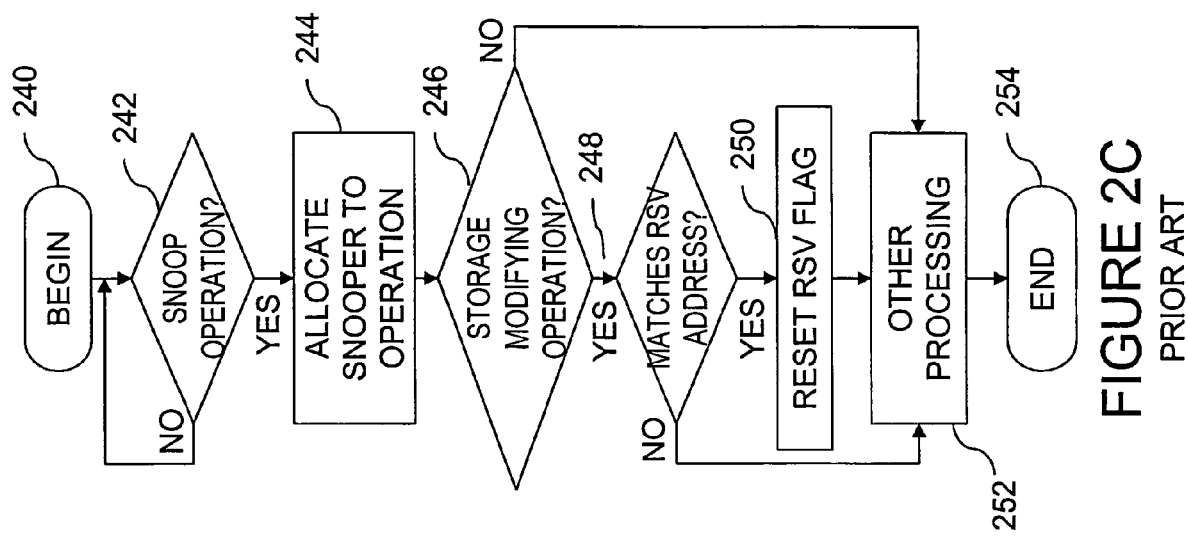

ENHANCED STCX DESIGN TO IMPROVE SUBSEQUENT LOAD EFFICIENCY

BACKGROUND OF THE INVENTION

1. Technical Field

The present invention relates in general to data processing systems and in particular to managing access to shared data in a data processing system. Still more particularly, the present invention relates to a system, method and computer program product for enhancing store conditional behavior to improve subsequent load efficiency.

2. Description of the Related Art

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the PowerPC® instruction set architecture with operation codes (opcodes) associated with the LWARX and STWCX mnemonics, respectively (referred to hereafter as LARX and STCX). The goal of load-reserve and store-conditional instruction pairs is to load and modify data and then to commit the modified data to coherent memory only if no other thread of execution has modified the data in the interval between the load-reserve and store-conditional instructions. Thus, updates to shared memory can be synchronized without the use of an atomic update primitive that strictly enforces atomicity.

With reference now to FIG. 1, a block diagram of a conventional MP computer system supporting the use of load-reserve and store-conditional instructions to synchronize updates to shared memory is illustrated. As shown, computer system 100 includes multiple processing units 102a-102b for processing data and instructions. Processing units 102 are coupled for communication to a system bus 104 for conveying address, data and control information between attached devices. In the depicted embodiment, the attached devices include a memory controller 106 providing an interface to a system memory 108 and one or more host bridges 110, each providing an interface to a respective mezzanine bus 112. Mezzanine bus 112 in turn provides slots for the attachment of additional devices, which may include network interface cards, I/O adapters, non-volatile storage device adapters, additional bus bridges, etc.

As further illustrated in FIG. 1, each processing unit 102 includes a processor core 120 containing an instruction sequencing unit 122 for fetching and ordering instructions for execution by one or more execution units 124. The instructions and associated data operands and data results are stored in a multi-level memory hierarchy having at its lowest level system memory 108, and at its upper levels L1 cache 126 and L2 cache 130. The data within the memory hierarchy may generally be accessed and modified by multiple processing units 102a, 102b.

L1 cache 126 is a store-through cache, meaning that the point of cache coherency with respect to other processing units 102 is below the L1 cache (e.g., at L2 cache 130). L1 cache 126 therefore does not maintain true cache coherency states (e.g., Modified, Exclusive, Shared, Invalid) for its cache lines, but only maintains valid/invalid bits. Store operations first complete relative to the associated processor core 120 in the L1 cache and then complete relative to other processing units 102 in L2 cache 130.

As depicted, in addition to the L2 cache array 140, L2 cache 130 includes read-claim (RC) logic 142 for managing memory access requests by the associated processor core 120, snoop logic 144 for managing memory access requests by other processing units 102, and reservation logic 146 for recording reservations of the associated processor core 120. Reservation logic 146 includes at least one reservation register comprising a reservation address field 148 and a reservation flag 150.

FIG. 2A depicts the manner in which a load-reserve (e.g., LARX) instruction is processed in data processing system 100 of FIG. 1. As shown, the process begins at block 200, which represents the execution of a LARX instruction by execution units 124 of processing unit 102a in order to determine the target address from which data is to be loaded. Following execution of the LARX instruction, the process pass to step 202, which illustrates processor core 120 issuing a LARX operation corresponding to the LARX instruction to RC logic 142 within L2 cache 130. As depicted at bock 204, RC logic 142 stores the address of the reservation granule (e.g., cache line) containing the target address in reservation address field 148 and sets reservation flag 150. Reservation logic 146 then begins monitoring for an indication by snoop logic 144 that another processing unit 102 has updated the cache line containing the target address. The process then passes to step 206, which depicts L1 cache 126 invalidating the cache line containing the target address. The cache line is invalidated in L1 cache 126 to prevent the LARX instruction from binding to a potentially stale value in L1 cache 126. The value is potentially stale because another processing unit 102 may have gained ownership of the target cache line in order to modify it.

Following block 206, the process passes to block 208. As illustrated at block 208, RC logic 142 obtains the load data from L2 cache array 140, system memory 108 or another processing unit 102 and then returns the requested load data to processor core 120. In response to receipt of the load data, processor core 120 stores the load data in an internal register, but not in L1 cache 126.

Processor core 120 thereafter attempts to perform an atomic update to the load data through the execution of a store-conditional (e.g., STCX) instruction in accordance with the process depicted in FIG. 2B. As shown, the process begins at block 220, which represents execution units 124 executing the store-conditional instruction to determine the target address of the store-conditional operation. Next, as depicted at block 222, the cache line containing the target address is invalidated in L1 cache 126, if valid. Although the cache line was invalidated earlier at block 202, the invalidation is still performed at block 222 because an intervening load operation to another address in the cache line may have caused the cache line to be loaded back into L1 cache 126.

Following block 222, processor core 120 issues a store-conditional (e.g., STCX) operation corresponding to the store-conditional instruction to RC logic 142 within L2 cache 130, as shown at block 224. RC logic 142 obtains owner permission for the target cache line and then determines at block 226 whether or not reservation flag 150 is still set (i.e., whether or not any other processing unit 102 has modified the reservation granule). If reservation flag 150 is still set, indicating that no other processing unit 102 has modified the reservation granule, RC logic 142 updates L2 cache array 140 with the store data and resets reservation flag 150, as shown at block 228. Reservation logic 146 then sends a pass indication to processor core 120, as shown at block 230. Thereafter, the process ends at block 234.

Returning to block 226, in response to a determination that reservation flag 150 is reset, indicating that another processing unit 102 has modified the reservation granule in the interval between execution of the load-reserve and store-conditional instructions, the store-conditional operation fails in L2 cache 130, and reservation logic 146 transmits a fail indication to processor core 120, as depicted at block 232. Thereafter, processing of the store-conditional operation terminates at block 234.

FIG. 2C illustrates the conventional operation of snoop logic 144 in support of shared memory updates utilizing load-reserve and store-conditional instructions. As depicted, the process begins at block 240 and thereafter proceeds to block 242, which illustrates the process iterating until snoop logic 144 snoops an operation on system bus 104. When snoop logic 144 snoops an operation on system bus 104, snoop logic 144 allocates a snooper to handle the operation at block 244. The snooper determines at block 246 whether or not the snooped operation is a storage-modifying operation. If not, the process passes to block 252 for other processing and thereafter terminates at block 254. If, however, the snooper determines that the snooped operation is a storage-modifying operation, the snooper makes a further determination at block 248 whether the address of the modifying operation matches the contents of reservation address field 148. If so, the snooper resets reservation flag 150 to cause any subsequent store-conditional operation to the address specified in reservation address field 148 to fail, as shown at block 250. Following block 250 or following a determination at block 248 that the address of the snooped modifying operation matches the contents of reservation address field 148, the snooper performs other processing at block 252 (e.g., updating the directory of L2 cache array 140). The process thereafter terminates at block 254.

LARX and STCX operations are often used to implement multi-processor locking mechanisms. A lock is acquired using a LARX/STCX pair, and the lock is usually considered acquired if the STCX succeeds. A lock is often stored in the same cache line as the data protected by it, as this behavior saves memory latency accessing the data after the lock is acquired. What is needed is a method to reduce L2 access in cases in which a lock is stored within the same cache line as the data it protects.

SUMMARY OF THE INVENTION

A method, system and computer program product for processing in a multiprocessor data processing system are disclosed. The method includes, in response to executing a load-and-reserve instruction in a processor core, the processing core sending a load-and-reserve operation for an address to a lower level cache of a memory hierarchy, invalidating data for the address in a store-through upper level cache, and placing data returned from the lower level cache into the store-through upper level cache.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

FIG. 2A is a flowchart of a conventional method of processing a load-reserve instruction;

FIG. 2B is a flowchart of a conventional method of processing a store-conditional instruction;

FIG. 2C is a flowchart of a conventional method of processing operations snooped on a system bus;

DETAILED DESCRIPTION OF THE PREFERRED EMBODIMENT

As noted above, LARX and STCX operations are used for implementing multi-processor locking mechanisms and locks are often stored in the same cache line as the data protected by them. The present invention improves performance, because after lock acquisition (e.g. a successful STCX), the data will reside in the L1 cache. Consequently, access latency is reduced as compared to the previous design, where the data would only be available in the L2 cache.

Figure 1:
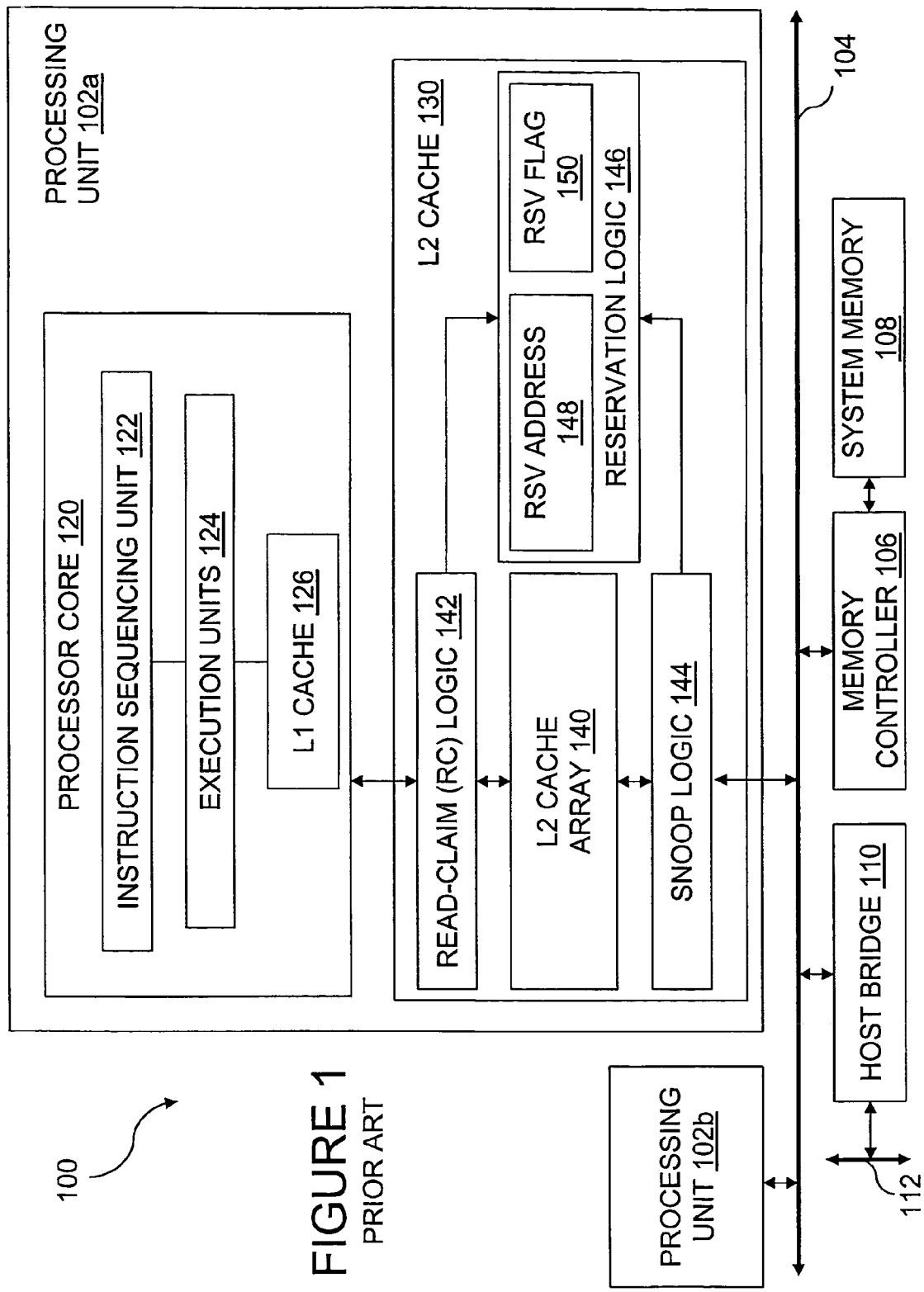
FIG. 1 is a high level block diagram of a conventional data processing system that utilizes load-reserve and store conditional instructions to update shared memory.
Figure 3:
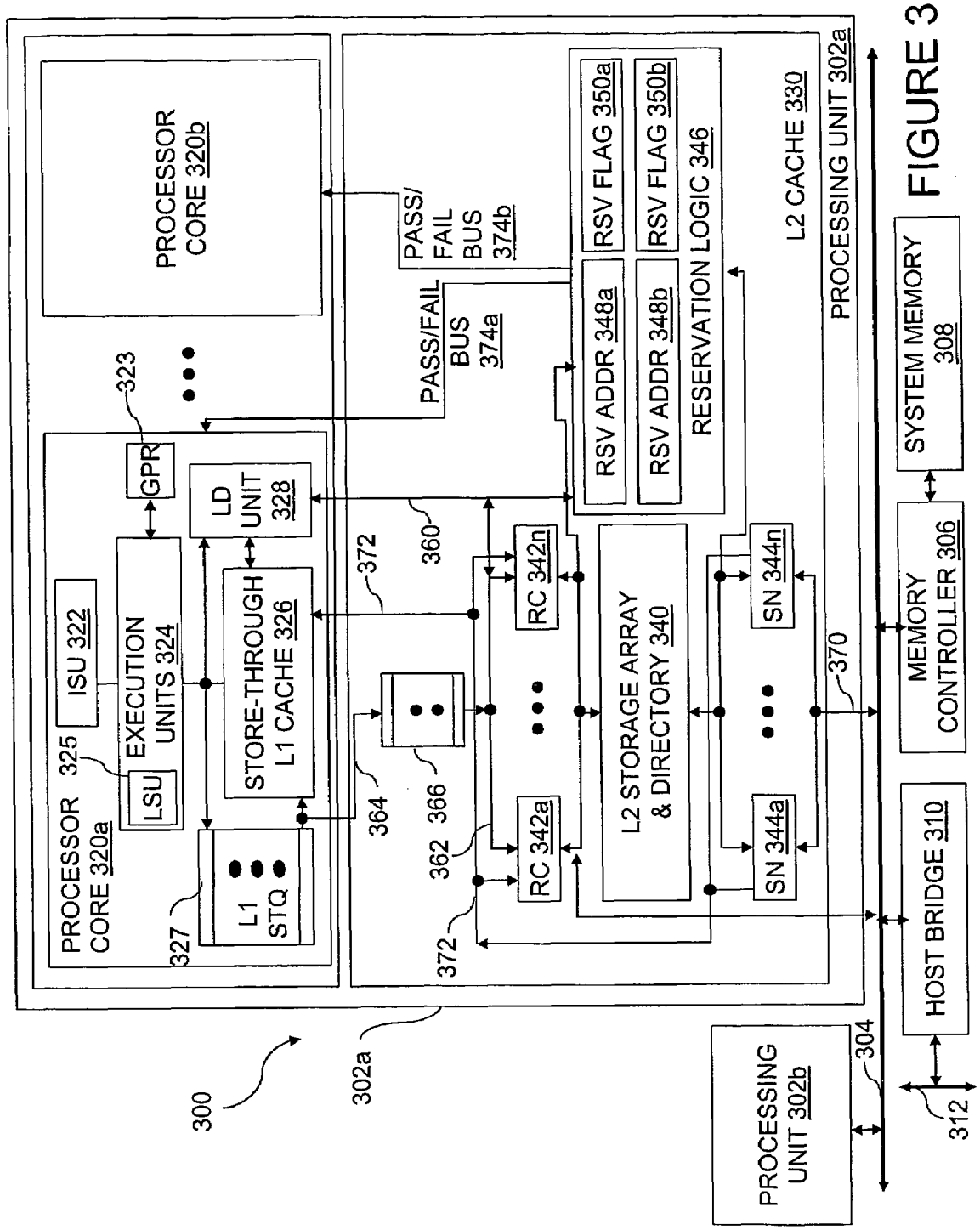
FIG. 3 is a high level block diagram of an illustrative data processing system in accordance with the present invention.

With reference again to the figures and in particular with reference to FIG. 3, there is illustrated a high level block diagram of an exemplary embodiment of a multiprocessor data processing system in accordance with the present invention. As shown, data processing system 300, which may be, for example, a server or workstation computer, includes multiple processing units 302a, 302b for processing data and instructions. Processing units 302 are coupled for communication to a system interconnect 304 for conveying address, data and control information between attached devices. The attached devices include not only processing units 302, but also a memory controller 306 providing an interface to a shared system memory 308 and one or more host bridges 310, each providing an interface to a respective mezzanine bus 312. Mezzanine bus 312 in turn provides slots for the attachment of additional unillustrated devices, which may include network interface cards, I/O adapters, non-volatile memory, non-volatile storage device adapters, additional bus bridges, etc.

As further illustrated in FIG. 3, each processing unit 302, which may be realized as a single integrated circuit, includes one or more processor cores 320a, 320b for processing instructions and data. Each processor core 320 includes a general purpose register (GPR) set 323, execution units 324, e.g. load-store unit LSU 325, for executing instructions, and an instruction sequencing unit (ISU) 322 for fetching and ordering instructions for execution by the execution units 324. In accordance with the present invention, the instructions executed by execution units 324 include load-reserve and store-conditional instructions, which are utilized to synchronize access to shared memory between a particular thread of execution and other concurrent threads of execution, whether executing in the same processor core 320, a different processor core 320 in the same processing unit 302, or in a different processing unit 302. In a preferred embodiment, execution units 324 execute at least load-reserve and store-conditional instructions in-order (other instructions may or may not be executed out-of-order).

Each processor core 320 further includes an L1 store queue (STQ) 327 and a load unit 328 for managing the completion of store and load operations, respectively, corresponding to executed store and load instructions (including load-reserve and store-conditional instructions). In a preferred embodiment, L1 STQ 327 is implemented as a First-In, First-Out (FIFO) queue containing a plurality of queue entries. Store operations are accordingly loaded in the "top" entry of L1 STQ 327 at execution of the corresponding store instruction to determine the target address, and are initiated when the store operation reaches the "bottom" or "commit" entry of L1 STQ 327.

It is important to note that the present application makes a distinction between "instructions", such as load-reserve and store-conditional instructions, and "operations". Load and store "instructions" (including load-reserve and store-conditional instructions) are defined herein as inputs to an execution unit that include an operation code (opcode) identifying the type of instruction and one or more operands specifying data to be accessed and/or its address. Load and store "operations", including load-reserve and store-conditional operations, are defined herein as data and/or signals generated following instruction execution that specify the address of data to be accessed. Thus, load-reserve and store-conditional operations may be transmitted from a processor core 320 to lower level memory to initiate data accesses, while load-reserve and store-conditional instructions are not.

The operation of processor core 320 is supported by an addressable multi-level volatile memory hierarchy having at its lowest level shared system memory 308, and at its upper levels two or more levels of cache memory, which in the illustrative embodiment include L1 cache 326 and L2 cache 330. In the particular embodiment shown in FIG. 3, L2 cache 330 is shared by all processor cores 320 within a processing unit 302. As in other shared memory MP data processing systems, the contents of the memory hierarchy may generally be accessed and modified by threads of execution executing in any processor core 320 in any processing unit 302 of data processing system 300.

In accordance with the present invention, L1 cache 326, which may include a bifurcated L1 data cache (D-cache) and instruction cache (I-cache), is implemented as a store-through cache, meaning that the point of cache coherency with respect to other processor cores 320 is located below L1 cache 326 and, in the depicted embodiment, is located at L2 cache 330. Accordingly, as described above, L1 cache 326 does not maintain true cache coherency states (e.g., Modified, Exclusive, Shared, Invalid) for its cache lines, but only maintains valid/invalid bits. Because L1 cache 326 is implemented as a store-through cache, store operations (including store-conditional operations) first complete relative to the associated processor core 120 in L1 cache 326 and then complete relative to other processing units 302 at a point of system-wide coherency, which in the depicted embodiment is L2 cache 330.

As further illustrated in FIG. 3, L2 cache 330 contains a storage array and directory 340 that store cache lines of instructions and data in association with their respective memory addresses. L2 cache 330 also includes a number of instances of read-claim (RC) logic 342a-342n for managing memory access operations received from the associated processor cores 320. RC logic instances 342a-342n receive load operations from LD unit 328 in processor core 320 via load bus 360 and command bus 362, and receive store operations from L1 STQ 327 in processor core 320 via store bus 364, an in-order L2 STQ 366, and command bus 362.

L2 cache 330 further includes a number of instances of snoop (SN) logic 344a-344n for managing memory access and other operations received from other processing units 302 via system interconnect 304 and snoop bus 370. Snoop logic instances 344 and RC logic instances 342 are each connected to a back-invalidation bus 372 by which any snoop logic instance 344 or RC logic instance 342 can signal the invalidation of a cache line to processor core 320.

L2 cache 330 finally includes reservation logic 346 for recording reservations of the associated processor core(s) 320. Specifically, reservation logic 346 includes, for each thread that may be concurrently executed by the processor core(s) 320 in its processing unit 302, a respective reservation register comprising a reservation address field 348 and a reservation flag 350. For example, in the depicted example, which assumes that processor cores 320a and 320b can each execute a single thread, reservation logic 346 includes two reservation registers: reservation address field 348a and reservation flag 350a for processor core 320a and reservation address field 348b and reservation flag 350b for processor core 320b. When set (e.g., to '1'), a reservation flag 350 indicates that the associated processor core 320 holds a reservation for the address contained in reservation address field 348 and otherwise indicates no reservation is held. Reservation logic 346 supplies pass/fail indications indicating the outcomes of store-conditional operations to processor cores 320a, 320b via respective pass/fail buses 374a, 374b.

Figure 4:
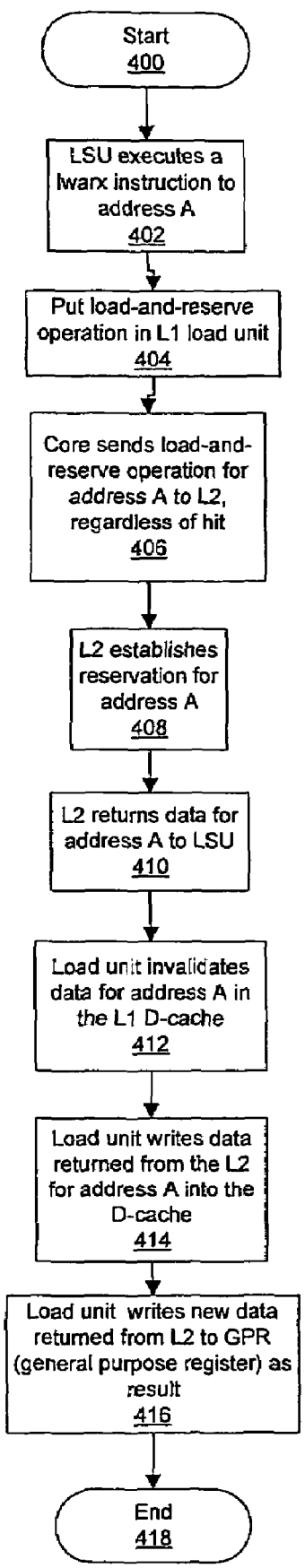
FIG. 4 is a high-level logical flowchart of an exemplary method of performing a load-reserve instruction in accordance with the present invention.

The present invention uses blocking as a means to maintain data without revealing an update on a multi-threaded processor core in situations in which data needs to remain hidden until an instruction succeeds. Turning now to FIG. 4, a high-level logical flowchart of steps used in the performance of a load-reserve (e.g. LWARX) instruction in accordance with the present invention is depicted. The process starts at step 400 and then proceeds to step 402, which depicts LSU 325 executing an LWARX instruction to calculate the target address A, from which data will be loaded. The process next moves to step 404. At step 404, execution units 324 put a load-and-reserve operation specifying address A in L1 load unit 328.

The process then proceeds to step 406, which illustrates processor core 320a sending a load-and-reserve operation for address A to L2 cache 330, regardless of whether a hit has been received from L1 cache 326. The process then moves to step 408. At step 408, L2 cache 330 establishes a reservation for address A using reservation logic 346. The process then moves to step 410, which depicts L2 cache 330 returning data for address A to LSU 325. The process next proceeds to step 412, which depicts load unit 328 invalidating data for address A in L1 cache 326. The process then moves to step 414.

At step 414, load unit 328 writes data returned from L2 cache 330 for address A into L1 cache (D cache) 326. The process next moves to step 416, which depicts load unit 328 loading new data returned from L2 cache 330 into general purpose register 323 as a result of the load-and-reserve operation. The process then ends at step 418.

Figure 5:
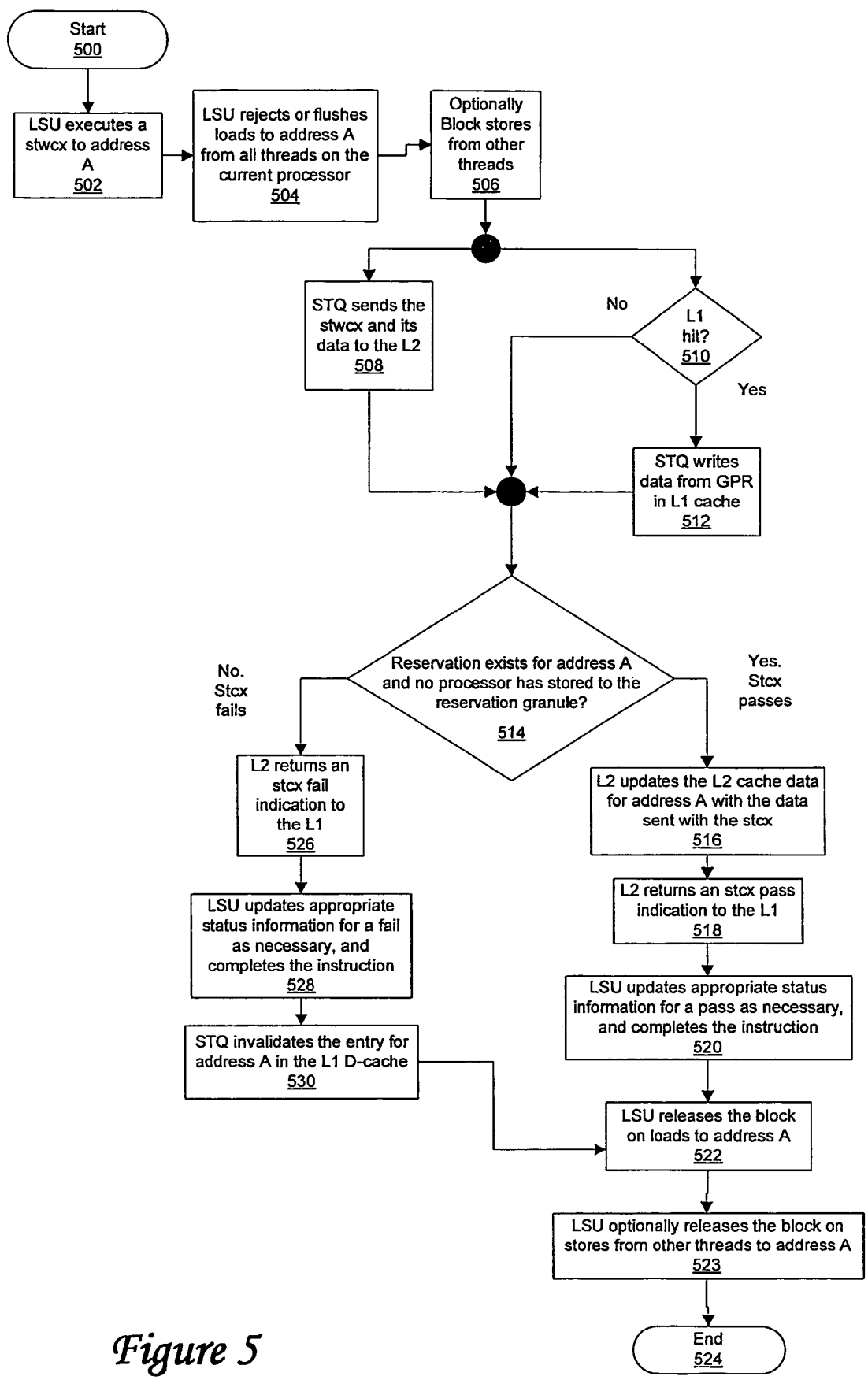
FIG. 5 is a high-level logical flowchart of exemplary method of performing a store-conditional instruction in accordance with the present invention.

Referring now to FIG. 5, a high-level logical flowchart of steps used in the performance of a store-conditional (e.g., an STWCX) instruction in accordance with the present invention is depicted. The process starts at step 500 and moves to step 502, which depicts LSU 325 executing a STWCX instruction to calculate the target address A to which data is to be stored. The process then moves to step 504. At step 504, LSU 325 rejects or flushes loads to address A from all threads on the current processor core 320, in this case processor core 320a. The process then proceeds to step 506. At step 506, execution units 324 block stores from other threads. This is an optional step, which is necessary if stores do not become visible in L1 cache 326 in the same order in which they are committed in the L2 cache 330. The process then moves in parallel to steps 508 and 510. At step 508, STQ 327 sends the STWCX operation and its data to L2 cache 330. The process then moves to step 514, which is described below. Concurrently, at step 510, STQ 327 determines whether target address A hits in L1 cache 326. If target address A hits in L1 cache 326, then the process moves to step 512, which depicts STQ 327 writing data from a general purpose register 323 into L1 cache 326. The process then moves to step 514, which is described below. Returning to step 510, if STQ 327 determines target address A did not hit in L1 cache 326, then the process moves to step 514.

At step 514, reservation logic 346 determines whether a reservation exists for address A. If a reservation exists for address A, then the STCWX instruction passes, and the process next proceeds to step 516, which depicts an RC machine 342 of L2 storage array and directory 340 updating the L2 cache 330 data with the data for address A sent with the STCWX operation. The process then proceeds to step 518, which depicts reservation logic 346, returning a STCWX pass indication on pass/fail bus 374a to L1 cache 326. The process next moves to step 520. At step 520, LSU 325 updates appropriate status information for a pass as necessary and completes the STWCX instruction. The process then proceeds to step 522, which illustrates LSU 325 releasing the block on loads to address A. The process next moves to step 523. At step 523, LSU 325 optionally releases the block on stores from other threads, if those other threads were optionally blocked at step 506. The process then ends at step 524.

Returning to step 514, if no reservation exists for address A, then the process next moves to step 526, which depicts reservation logic 346 returning a STCWX fail indication to L1 cache 326 on pass/fail bus 374a. The process then proceeds to step 528. At step 528, LSU 325 updates appropriate status information for a fail as necessary and completes the STWCX instruction. The process then proceeds to step 530, which depicts STQ 327 invalidating the entry for address A in L1 cache (D cache) 326. The process then proceeds to step 522, which is described above.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing medial include, without limitation, recordable type media such as floppy disks or CD ROMs and transmission type media such as analog or digital communication links.

What is claimed is:

1. A method of processing in a multiprocessor data processing system including a memory hierarchy including a store-through upper level cache, a lower level cache and a system memory, said method comprising:
   in response to executing a load-and-reserve instruction in a processor core, wherein said load-and-reserve instruction is characterized by setting a reservation in a unit of reservation logic:
   the processing core sending a load-and-reserve operation for an address to said lower level cache of said memory hierarchy,
   invalidating data for said address in said store-through upper level cache, and
   placing data returned from said lower level cache of said memory hierarchy into said store-through upper level cache.

2. The method of claim 1, further comprising:
   in response to executing a store-conditional instruction in said processor core, said processing core determining whether said store-through upper level cache was hit; and
   in response to determining said store-through upper level cache was hit, writing data from a general purpose register to said store-through upper level cache.

3. The method of claim 2, further comprising flushing loads to said address from all threads on said processor core.

4. The method of claim 2, wherein:
   said method further comprises determining whether a reservation exists for said address on said processor core; and
   writing said data to a lower level cache only if a reservation exists.

5. The method of claim 4, further comprising, in response to determining that said reservation does not exist for said address on said processor core, invalidating an entry for said address in said store-through upper level cache.

6. The method of claim 4, further comprising, in response to determining that said reservation exists for said address on said processor core, releasing a block on one or more loads to said address.

7. A processing unit, comprising:
   a store-through upper-level cache;
   a general-purpose register;
   an execution unit that executes a load-and-reserve instruction, wherein said load-and-reserve instruction is characterized by setting a reservation in a unit of reservation logic;
   a load unit that sends a load-and-reserve operation for an address to a lower level cache of a memory hierarchy, that invalidates data for said address in said store-through upper-level cache, and that places data returned from said lower-level cache of said memory hierarchy in response to said load-and-reserve operation into said store-through upper level cache.

8. The processing unit of claim 7, further comprising:
   an upper-level store queue that, responsive to execution of a store-conditional instruction by said execution unit, determines whether said store-through upper-level cache was hit, and responsive to determining said store-through upper-level cache was hit, writes data from said general purpose register to said lower-level cache.

9. The processing unit of claim 8, wherein said execution unit flushes loads to said address from all threads on said processor core.

10. The processing unit of claim 8, wherein a lower-level store queue writes said data into said lower-level cache only in response to an identification that a reservation for said address exists.

11. The processing unit of claim 10, wherein said upper-level store queue, responsive to a determination that said reservation does not exist for said address on said processor core, invalidates an entry for said address in said store-through upper level cache.

12. The processing unit of claim 10, wherein said upper-level store queue, responsive to a determination that said reservation exists for said address on said processor core, releases a block on one or more loads to said address.

13. The processing unit of claim 7, further comprising reservation logic.

14. A data processing system, comprising:
- a memory hierarchy including a store-through upper level cache, a lower level cache and a system memory;
- a general-purpose register;
- an execution unit that executes a load-and-reserve instruction, wherein said load-and-reserve instruction is characterized by setting a reservation in a unit of reservation logic; and
- a load unit that sends a load-and-reserve operation for an address to said lower-level cache of said memory hierarchy, that invalidates data for said address in said store-through upper-level cache, and that places data returned from said lower-level cache of said memory hierarchy in response to said load-and-reserve operation into said store-through upper level cache.

15. The data processing system of claim 14, further comprising:
- an upper-level store queue that, responsive to execution of a store-conditional instruction by said execution unit, determines whether said store-through upper-level cache was hit, and responsive to determining said store-through upper-level cache was hit, writes data from said general purpose register to said store-through upper level cache.

16. The data processing system of claim 15, wherein said execution unit flushes loads to said address from all threads on said processor core.

17. The data processing system of claim 15, wherein a lower level store queue writes said data into said lower-level cache only in response to receipt of an identification that a reservation for said address exists.

18. The data processing system of claim 17, wherein said upper-level store queue, responsive to a determination that said reservation does not exist for said address on said processor core, invalidates an entry for said address in said store-through upper level cache.

19. The data processing system of claim 17, wherein said upper-level store queue, responsive to said determination that said reservation exists for said address on said processor core, releases a block on one or more loads to said address.

20. The data processing system of claim 14, further comprising reservation logic.

* * * * *